United States Patent
Choi

(10) Patent No.: US 7,359,159 B2
(45) Date of Patent: Apr. 15, 2008

(54) ACTUATOR FOR HARD DISK DRIVE HAVING A REINFORCED STRUCTURE

(75) Inventor: Il-yeon Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 998 days.

(21) Appl. No.: 10/391,778

(22) Filed: Mar. 20, 2003

(65) Prior Publication Data

US 2003/0179503 A1 Sep. 25, 2003

(30) Foreign Application Priority Data

Mar. 25, 2002 (KR) .............................. 2002-16088

(51) Int. Cl.
*G11B 5/54* (2006.01)

(52) U.S. Cl. .................................................. 360/265.8

(58) Field of Classification Search .............. 360/265.8
See application file for complete search history.

(56) References Cited

U.S. PATENT DOCUMENTS

| | | | |
|---|---|---|---|
| 5,600,516 A * | 2/1997 | Phillips et al. ............ | 360/265.1 |
| 5,734,528 A * | 3/1998 | Jabbari et al. .............. | 360/265 |
| 5,900,303 A * | 5/1999 | Billarant .................... | 428/100 |
| 5,984,055 A * | 11/1999 | Strasser et al. .......... | 188/251 A |
| 6,190,165 B1 * | 2/2001 | Andreiko et al. .............. | 433/9 |
| 6,397,699 B1 * | 6/2002 | Ikemoto et al. .......... | 74/490.01 |

(Continued)

FOREIGN PATENT DOCUMENTS

| JP | 2002-32969 | | 1/2002 |
|---|---|---|---|
| JP | 2002-32969 A | * | 1/2002 |

OTHER PUBLICATIONS

Patent Abstract of Japan for Japanese Publication No. 2001155447, Publication date Jun. 08, 2001.

(Continued)

*Primary Examiner*—Jefferson Evans
(74) *Attorney, Agent, or Firm*—Staas & Halsey LLP

(57) ABSTRACT

An actuator of a hard disk drive moving a magnetic head to a predetermined position on a disk to record and read out data on and from the disk, including a suspension supporting a slider on which the magnetic head is mounted, an actuator arm having a pivot hole formed in a middle portion of the actuator arm and installed on a base plate of the hard disk drive to be capable of pivoting, in which the suspension is installed at one end portion of the actuator arm, and a voice coil motor having a coil coupled to the other end portion of the actuator arm by interposing a molding portion therebetween and at least one magnet arranged to be separated a predetermined distance from the coil and to face at least one surface of an upper surface and a bottom surface of the coil. In the actuator, a plurality of protrusions protruding toward the molding portion are provided at a contact surface of the actuator arm contacting the molding portion so that a contact area between the molding portion and the actuator arm in horizontal and vertical direction increases. Thus, since a contact area between the molding portion and the actuator arm in the horizontal and vertical directions increases, a coupling force therebetween increases so that a stable operation of the actuator can be guaranteed.

3 Claims, 4 Drawing Sheets

U.S. PATENT DOCUMENTS

| | | | |
|---|---|---|---|
| 6,650,507 B2 * | 11/2003 | Nelson et al. | 360/265.1 |
| 6,683,756 B1 * | 1/2004 | Zhao et al. | 360/265.8 |
| 6,787,941 B2 * | 9/2004 | Takashima | 310/12 |
| 6,939,123 B2 * | 9/2005 | Peterson et al. | 425/470 |
| 7,042,681 B1 * | 5/2006 | Fruge et al. | 360/265.8 |
| 2001/0033461 A1 | 10/2001 | Koester et al. | |

OTHER PUBLICATIONS

Patent Abstract of Japan for Japanese Publication No. 2001110151, Publication date Apr. 20, 2001.

* cited by examiner

ACTUATOR FOR HARD DISK DRIVE HAVING A REINFORCED STRUCTURE

CROSS-REFERENCE TO RELATED APPLICATIONS

This application claims the benefit of Korean Application No. 2002-16088, filed Mar. 25, 2002, in the Korean Intellectual Property Office, the disclosure of which is incorporated herein by reference.

BACKGROUND OF THE INVENTION

1. Field of the Invention

The present invention relates to a hard disk drive, and more particularly, to an actuator of a hard disk drive having a structure to reinforce a coupling force between an actuator arm and a molding portion.

2. Description of the Related Art

A hard disk drive (HDD) is one of auxiliary memory devices to read out and record data from and on a magnetic disk by using a magnetic head.

FIG. 1 is a perspective view showing a conventional hard disk drive. Referring to the drawing, a conventional hard disk drive includes a housing 10, a magnetic disk (hard disk) 20 which is a recording medium installed in the housing 10, a spindle motor 30 installed on a base plate 11 of the housing 10 to rotate the disk 20, and an actuator 40 having a magnetic head for recording/reading out data.

The housing 10 is installed in a main body of a computer and includes the base plate 11 supporting the spindle motor 30 and the actuator 40, and a cover plate 12 coupled to the base plate 11 enclosing and protecting the disk 20. The housing 10 is typically manufactured of a stainless and/or aluminum material.

The disk 20 is a recording medium for data recording and a single or a plurality of disks are installed at predetermined distances from each other and capable of being rotated by the spindle motor 30. A parking (landing) zone 21 is provided at the inner circumferential side of the disk 20, where a slider 42 with a magnetic head (not shown) is accommodated when the power is turned off. A data zone 22 where data is stored is provided outside the landing zone 21.

The actuator 40 includes an actuator arm 46 capable of pivoting around a pivot shaft 47 on the base plate 11, the slider 42, and a suspension 44 installed at one end portion of the actuator arm 46. The suspension elastically biases the slider 42 toward the surface of the disk 20. A voice coil motor 48 pivots the actuator arm 46.

In the conventional hard disk drive having the above structure, when the power is turned off, the slider 42 is accommodated in the landing zone 21 of the disk 20 by the elastic force of the suspension 44. When the power is turned on, the disk 20 starts to rotate and then lift is generated by air pressure. Accordingly, the slider 42 is lifted. The slider 42 is moved to the data zone 22 of the disk 20 by the pivot of the actuator arm 46 of the actuator 40. The slider 42 maintains a height that balances the upward lift caused by the rotation of the disk 20 and the downward elastic force provided by the suspension 44. Thus, the magnetic head mounted on the slider 42 records and reads out data with respect to the disk 20 while maintaining a predetermined distance from the rotating disk 20.

In the hard disk drive, as described above, a single or a plurality of disks are installed. Conventionally, four or more disks are installed in the hard disk drive to increase data storage capacity. Since the surface recording density of a disk has recently increased sharply, one or two disks can store a sufficient amount of data. In particular, a hard disk drive in a method of using a single disk and recording data on one or both side surfaces thereof has been researched and developed. In this case, since only one or two magnetic heads are needed, the actuator has one or two actuator arms and a low profile actuator having a relatively low height can be used.

FIG. 2 is a perspective view showing a conventional low profile actuator. FIG. 3 is an enlarged sectional view taken along line A-A of FIG. 2.

Referring to FIGS. 2 and 3, a conventional low profile actuator 50 has an actuator arm 56 where a pivot hole 57 is provided in the middle portion thereof. A suspension 54 that elastically biases the slider 52 toward the surface of a disk (not shown) is installed at one end portion of the actuator arm 56. A coil 58a of a voice coil motor 58 is coupled to the other end portion of the actuator arm 56. A magnet 58b of the voice coil motor 58 is installed above and under the coil 58a a predetermined distance from the coil 58a.

The actuator arm 56 is manufactured by press processing and/or stamp processing a metal material, for example, an aluminum plate. The coil 58a is coupled to the other end portion of the actuator arm 56 by interposing a molding portion 59 therebetween. The molding portion 59 is formed by injecting plastic resin between the coil 58a and the actuator arm 56 so that the coil 58a is fixedly coupled to the actuator arm 56 by an adhesive force between the molding portion 59 and each of the coil 58a and the actuator arm 56.

The actuator 50 having the above structure is controlled by a servo control system (not shown) and moves in a direction according to Fleming's left hand rule by the interaction between current input to the coil 58a and a magnetic field formed by the magnet 58b. The actuator 50 pivots according to the direction of the current applied to the coil 58a by the servo control system. Rapid changes in the current result in rapid movement of the magnetic head 51, which is an important factor for determining a seek time of the hard disk drive. For better performance, it is advantageous to generate a strong force (torque) by applying sufficient current to create a high intensity magnetic field.

During hard disk drive operation, the actuator constantly pivots and changes direction to appear to move the magnetic head 51 almost instantaneously. The repetitive motion causes vibration having a variety of frequencies and amplitude. This vibration is a factor for vibrating the magnetic head 51. When the magnetic head 51 vibrates, a position error signal (PES) increases, which consequently affects the function of the magnetic head 51 performing read/write operations along a track formed on the disk. Since the performance of a hard disk drive can be improved by minimizing the vibration, the dynamic characteristic of each part must be designed to be optimal and the fixed position between the respective parts must be firmly maintained.

In the conventional actuator 50, however, the contact surface between the actuator arm 56 and the molding portion 59 coupling the coil 58a to the actuator arm 56 is simply flat, resulting in a weak coupling strength therebetween. Thus, when vibration is generated at the actuator 50, the molding portion 59 may partially separate from the actuator arm 56. Accordingly, the vibration of the actuator 50 increases and the performance of the magnetic head 51 deteriorates. Also, the molding portion 59 can be detached from the actuator arm 56 by an impact applied when the actuator 50 is manufactured or the hard disk drive is assembled or delivered. As the separation between the molding portion 59 and the actuator arm 56 becomes worse, a resonance frequency of the actuator 50 tends to decrease. When the resonance frequency decreases a range controlled by the servo control system, normal operation of the actuator 50 is not possible. In particular, in the low profile actuator 50, the thickness of the actuator arm 56 is very thin Thus, a contact area between the molding portion 59 and the actuator arm 56 is small so that the above problems can become more severe.

U.S. Pat. No. 5,165,090 discloses a swing type actuator in which a groove is formed at the outer circumferential surface of a coil to increase a bonding strength between the coil and a hold member. However, it is difficult to form a groove at the outer circumferential surface of the coil, which also requires an additional step. This method may be suitable if the hold member is manufactured with thermoplastic resin. However, it is difficult to apply the above method to an arm manufactured with a metal material such as aluminum as described with reference to FIGS. 2 and 3.

SUMMARY OF THE INVENTION

To solve the above-described problems, it is an aspect of the present invention to provide an actuator of a hard disk drive having a structure to reinforce a coupling force between an actuator arm and a molding portion by increasing a contact area between the actuator arm and the molding portion to realize a stable operation of the actuator.

Additional aspects and advantages of the invention will be set forth in part in the description which follows and, in part, will be obvious from the description, or may be learned by practice of the invention.

To achieve the above and/or other aspects of the present invention, an actuator of a hard disk drive is operable to move a magnetic head to a predetermined position on a disk to record and read out data on and from the disk, the actuator comprising a suspension supporting a slider on which the magnetic head is mounted, an actuator arm having a pivot hole in a middle portion of the actuator arm and pivotably installed on a base plate of the hard disk drive. A suspension is installed at one end portion of the actuator arm, and a voice coil motor is coupled to the other end portion of the actuator arm by interposing a molding portion therebetween. At least one magnet is separated a predetermined distance from the coil and facing at least one surface of the coil. A plurality of protrusions protruding toward the molding portion at a contact surface of the actuator arm extend toward the molding portion so that a contact area between the molding portion and the actuator arm increases.

In one implementation, the protrusions are at a vertical middle portion of the contact surface and have a thickness thinner than that of the actuator arm.

In another implementation, the protrusions are formed in a lengthwise direction of the contact surface at a predetermined interval.

In still another implementation, the protrusions are continuously formed in a lengthwise direction of the contact surface with a saw-toothed shape.

In another implementation, the protrusions are formed such that a width of a protruding end portion of each protrusion is greater than that of a base end portion thereof.

BRIEF DESCRIPTION OF THE DRAWINGS

The above and/or other aspects and advantages of the present invention will become more apparent by describing in detail preferred embodiments thereof with reference to the attached drawings in which.

DETAILED DESCRIPTION OF THE PREFERRED EMBODIMENTS

Figure 1:
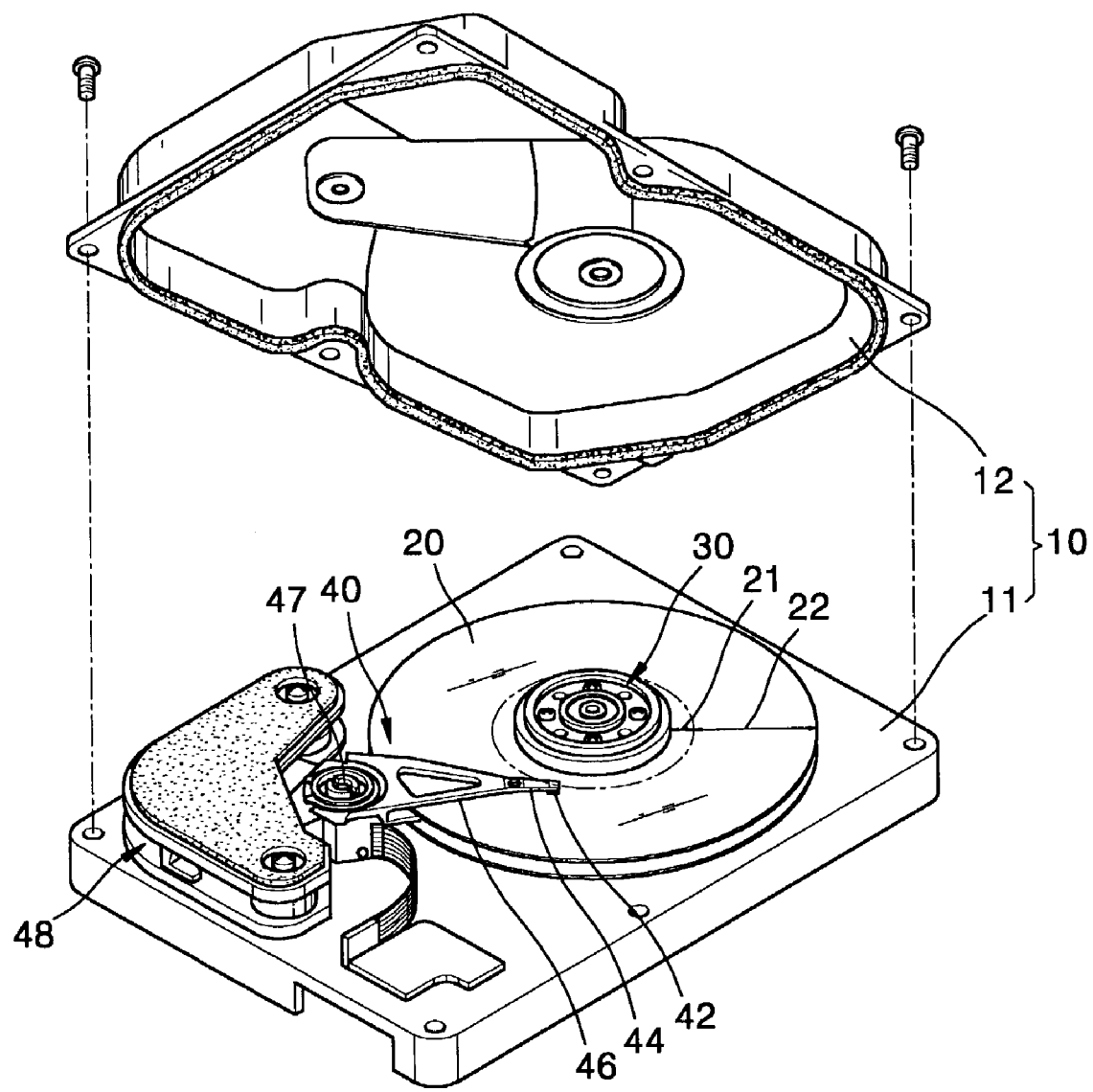
FIG. 1 is an exploded perspective view of a conventional hard disk drive.

Reference will now be made in detail to the preferred embodiments of the present invention, examples of which are illustrated in the accompanying drawings, wherein like reference numerals refer to like elements throughout.

Figure 4:
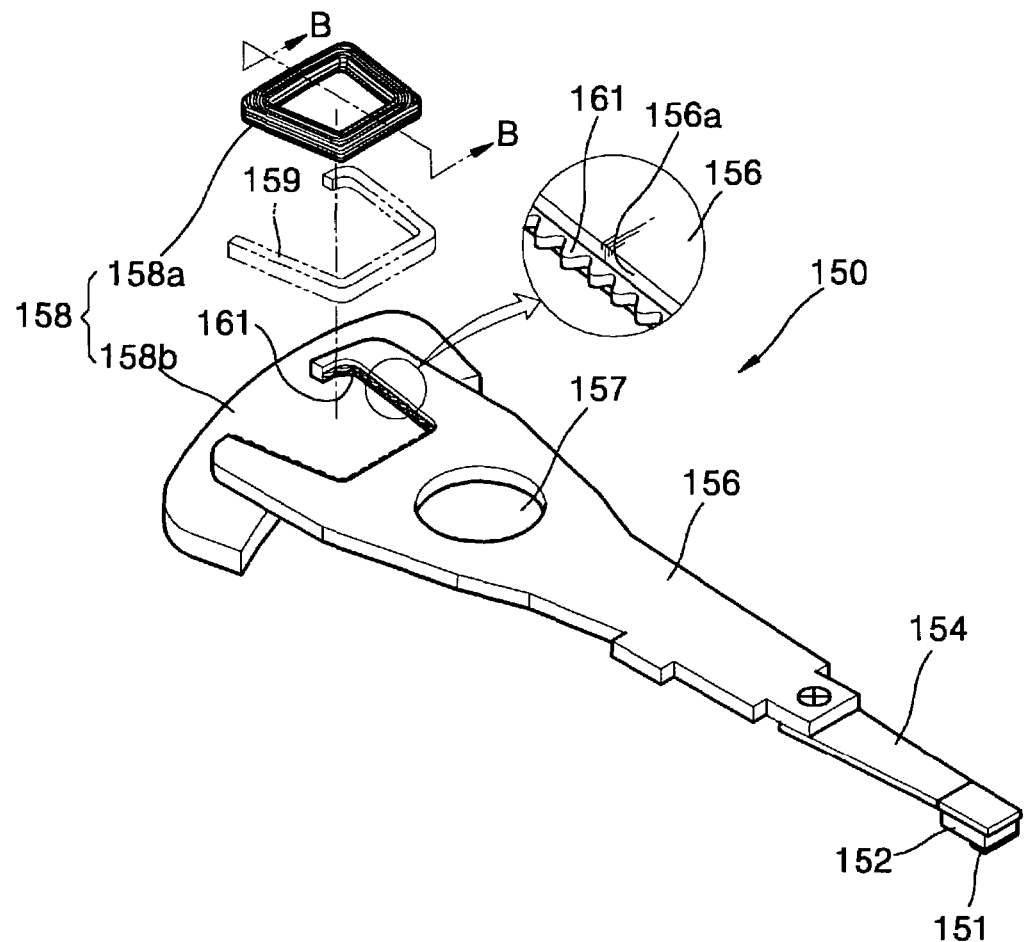
FIG. 4 is an exploded perspective view of an actuator of a hard disk drive according to an embodiment of the present invention.
Figure 5:
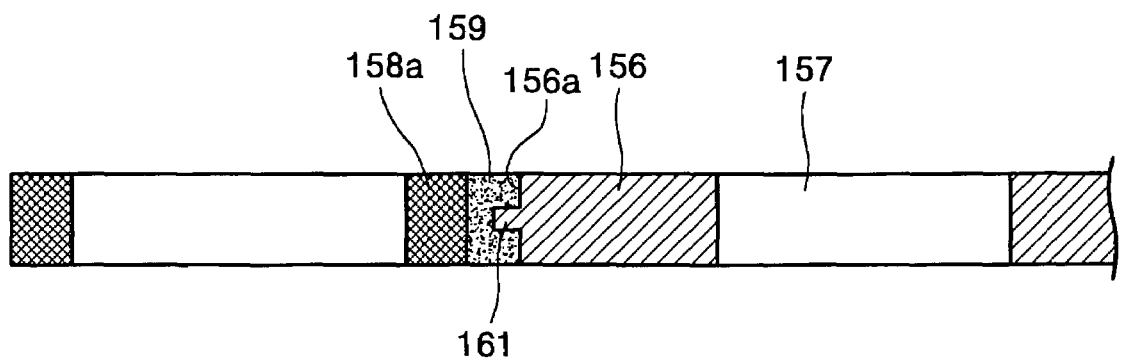
FIG. 5 is a sectional view of a coil portion taken along line B-B of FIG. 4.

Referring to FIGS. 4 and 5, an actuator 150 of a hard disk drive according to the present invention moves a magnetic head 151 to a predetermined position on a disk (not shown) to record or read out data on the disk. The actuator 150 includes an actuator arm 156 installed on a base plate (not shown) of the hard disk drive that is capable of pivoting. For this purpose, a pivot hole 157 is at the middle portion of the actuator arm 156. A suspension 154 attached to one end of the actuator arm 156 supports a slider 154, on which the magnetic head 151 is mounted, and the slider 154 elastically biases the magnetic head 151 toward the surface of the disk.

Figure 2:
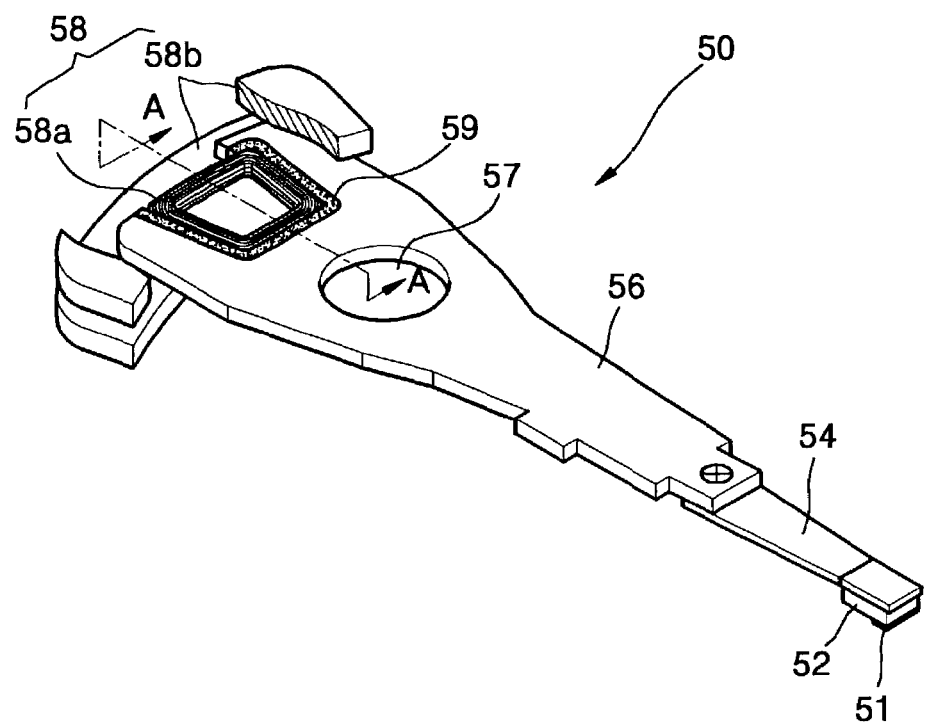
FIG. 2 is a perspective view of a conventional low profile actuator.
Figure 3:
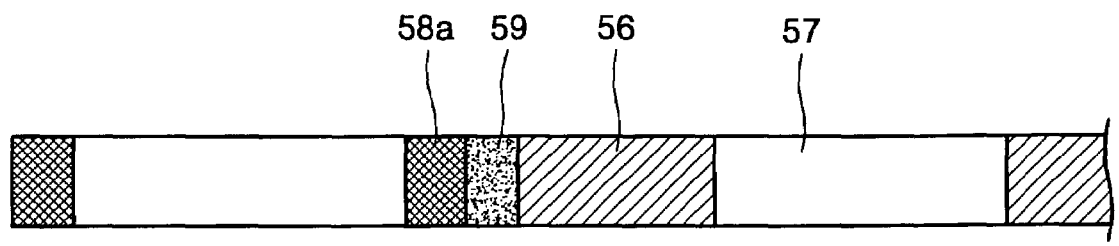
FIG. 3 is an enlarged sectional view of a coil portion taken along line A-A of FIG. 2.

A voice coil motor 158 pivots the actuator arm 156. The voice coil motor 158 includes a coil 158a coupled to the other end portion of the actuator arm 156 by interposing a molding portion 159 therebetween. A magnet 158b is separated a predetermined distance from the coil 158a facing the bottom surface of the coil 158a. A permanent magnet may be used as the magnet 158b and installed on the base plate of the hard disk drive. Although FIG. 4 shows that only one magnet 158b is installed as shown in FIG. 2, the magnet can be installed above the coil 158a to face the upper surface of the coil 158a or more than one magnet may be used.

The actuator arm 156 is manufactured by press processing or stamp processing a metal material such as an aluminum plate. The molding portion 159 that couples the coil 158a to the other end portion of the actuator arm 156 is formed by injecting plastic resin between the coil 158a and the actuator arm 156. According to the present invention, a plurality of protrusions 161 protruding toward the molding portion 159 are at a contact surface 156a of the actuator arm 156 to provide more contact surface area with the molding portion 159. The protrusions 161 can be formed when the actuator arm 156 is manufactured. That is, the protrusions 161 can be simultaneously formed when an aluminum plate is press-processed or stamp-process to manufacture the actuator arm 156. Thus, an additional step to form the protrusions 161 is not needed.

As shown in the drawings, the protrusions 161 have a saw-toothed shape and are sequentially formed in the lengthwise direction of the contact surface 156a. The protrusions 161 can be separated a predetermined distance from one another either partially or over the entire contact surface 156a. Vertical and horizontal contact areas between the molding portion 159 and the actuator arm 156 are increased by the protrusions 161 so that a coupling force therebetween is reinforced. Also, since the protrusions 161 restrict relative horizontal movement between the molding portion 159 and the actuator arm 156, the molding portion 159 cannot separate from the actuator arm 156 by a horizontal vibration or impact. Since, the vibration of the actuator arm 150 due to separation between the molding portion 159 and the actuator arm 156 is reduced, a position error signal (PES) is also reduced and a stable operation of the magnetic head 151 improves performance of the hard disk drive.

Preferably, each of the protrusions 161 has a thickness thinner than that of the actuator arm 156 and is at the vertical middle portion of the contact surface 156a. Thus, the upper and lower surfaces of the respective protrusions 161 are covered by the molding portion 159. Such a structure prevents the molding portion 159 from detaching from the actuator arm 156 by a vibration or impact in the vertical direction.

Figure 6:
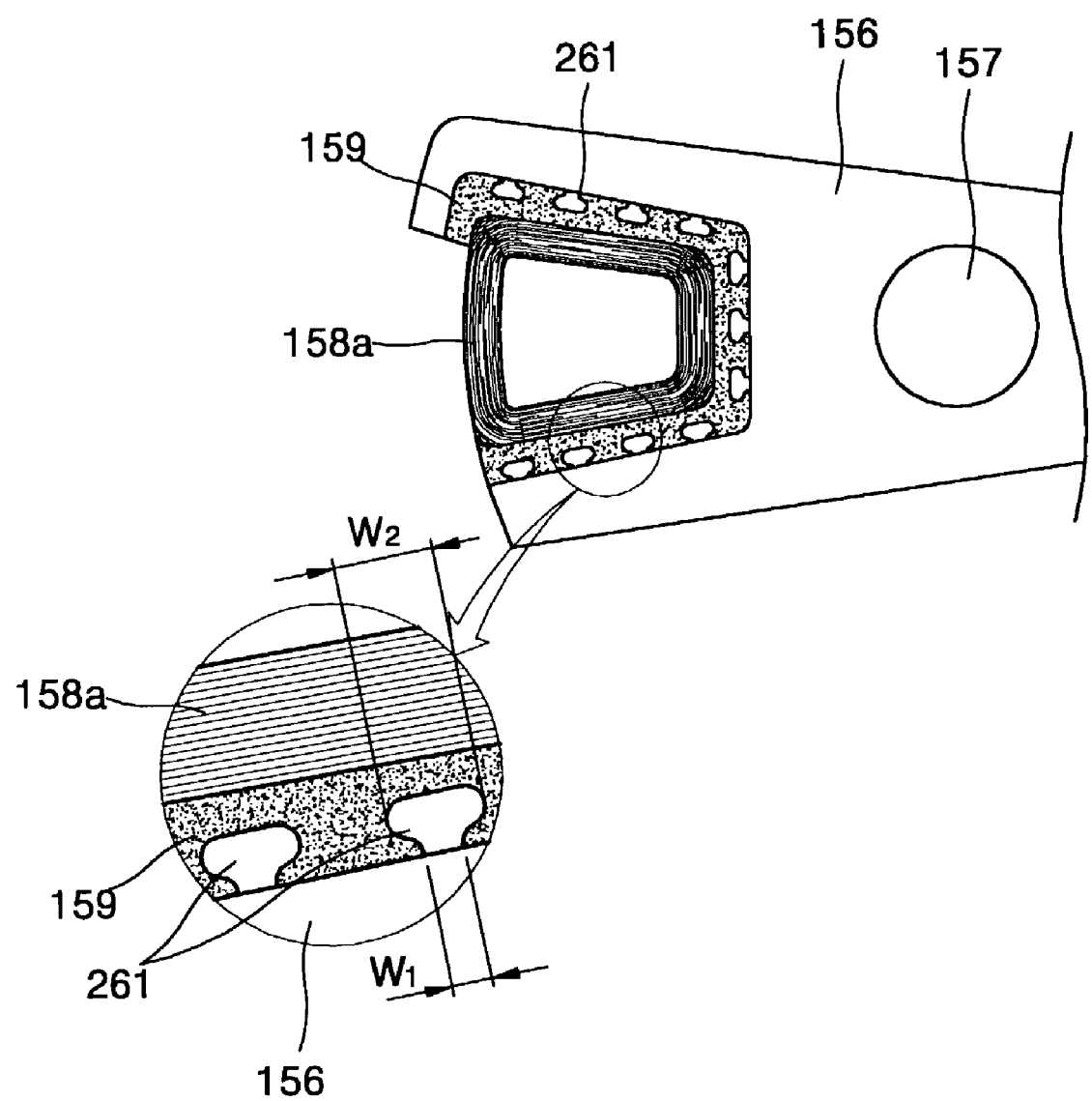
FIG. 6 is a plan view of a modified example of the protrusions shown in FIG. 4.

FIG. 6 shows a modified example of the protrusions shown in FIG. 4.

Referring to FIG. 6, each protrusion 261 has a shape in which a width $W_2$ of a protruding end portion thereof is greater than that of a width $W_1$ of a base end portion thereof. That is, each of the protrusions 261 has a shape in which a portion close to the contact surface 156a of the actuator arm 156 has a narrower width while a portion of the protrusion inserted deep in the molding portion 159 has a wider width. Also, instead of the shape shown in FIG. 6, the protrusions 261 can have a variety of shapes such as a reverse triangle shape with the width W2 of the protrusion end portion being wider than the width W1 of the base end portion.

The protrusions 261 having the above shapes increase the contact area between the molding portion 159 and the actuator arm 156, which is quite effective in preventing the molding portion 159 from detaching from the actuator arm 156 by a vibration or impact in the horizontal direction. Also, as described above, the protrusions 261 shown in FIG. 6 can be formed simultaneously when the actuator arm 156 is manufactured.

As described above, the actuator of a hard disk drive according to the present invention increases a contact area between the molding portion and the actuator arm, which increases a coupling strength therebetween. Thus, since the vibration of the actuator due to a defective coupling state between the molding portion and the actuator arm is reduced, a position error signal decreases and a stable operation of the magnetic head improves performance of the hard disk drive. Further, the separation of the molding portion from the actuator arm due to vertical or horizontal vibration or an external impact can be prevented. Since the protrusions formed at the actuator arm can be simultaneously formed when the actuator arm is manufactured, an additional step is not needed.

Although an actuator having a single actuator arm is described in the above embodiments, the present invention can be applied to an actuator having two or more actuator arms. Also, the protrusions can have a variety of shapes so long as the shape satisfies the conditions needed to achieve the purpose of the present invention.

Although a few preferred embodiments of the present invention have been shown and described, it would be appreciated by those skilled in the art that changes may be made in these embodiments without departing from the principles and spirit invention, the scope of which is defined in the claims and their equivalents.

What is claimed is:

1. A method of manufacturing an actuator for a hard disk drive having increased coupling strength between an actuator arm and a coil:

molding an actuator arm having a bottom surface, a top surface, a cut-out area between the bottom surface and the top surface defining a wall, and protrusions extending from the wall;

positioning a coil in the cut-out area proximate to the wall and the protrusions; and adhering the coil to the actuator arm by application of an adhesive between the coil and the wall to envelope the protrusions, wherein the molding includes press molding.

2. The method of claim 1, wherein the protrusions have a height not extending to the bottom surface or the top surface such that the molding of the actuator arm includes molding the actuator arm with protrusions not extending to the bottom surface or the top surface.

3. A method of manufacturing an actuator for a hard disk drive having increased coupling strength between an actuator arm and a coil:

molding an actuator arm having a bottom surface, a top surface, a cut-out area between the bottom surface and the top surface defining a wall, and protrusions extending from the wall;

positioning a coil in the cut-out area proximate to the wall and the protrusions; and adhering the coil to the actuator arm by application of an adhesive between the coil and the wall to envelope the protrusions, wherein the molding includes stamp molding.

* * * * *